3,676,290
POLYVINYL FLUORIDE SURFACED LAMINATES
Richard R. Hetrick, Bainbridge, N.Y., assignor to
Westinghouse Electric Corporation, Pittsburgh, Pa.
Filed May 15, 1969, Ser. No. 824,769
Int. Cl. B32b 27/08, 27/42, 27/30
U.S. Cl. 161—189                    6 Claims

ABSTRACT OF THE DISCLOSURE

A weatherproof outdoor laminate is made from a core layer impregnated with a phenolic resin, a print sheet layer impregnated with an aminotriazine-aldehyde resin and an outer polyvinyl fluoride layer having at least one adherable activated side, wherein the activated side of the polyvinyl fluoride outer layer is bonded directly to the print sheet layer without the use of an adhesive layer.

BACKGROUND OF THE INVENTION

This invention relates to low cost, weatherproof, outdoor decorative laminates. More particularly, this invention relates to outdoor laminates protected by an outer polyvinyl fluoride film which is bonded directly to the body of the laminate without the use of an adhesive layer.

The advantages of polyvinyl fluoride protective layers for laminates have been recognized by Simms (U.S. Pat. No. 3,133,854), Kamal (U.S. Pat. No. 3,313,676), and Perry (U.S. Pat. No. 3,403,071).

Polyvinyl fluoride films have been bonded to a variety of substrates using vinyl, aminotriazine-aldehyde, acrylic, polyester, nitrile or other modified rubber, and epoxy intermediate adhesive layers. But, the use of adhesive layers and resins adds significantly to material costs. Their use requires additional solvents, activators, catalysts and an additional coating and curing step during laminate fabrication. There are many other disadvantages in using adhesives with polyvinyl fluoride protected laminates. Many adhesives have poor weathering properties and cause discoloration of the laminate especially when clear polyvinyl fluoride protective films are used. Many other commercial adhesives have poor adhesive bond strength when used to laminate polyvinyl fluoride films to substrates.

SUMMARY OF THE INVENTION

Accordingly, it is an object of this invention to provide new, improved and less expensive polyvinyl fluoride protected outdoor laminates.

A further object of this invention is to provide new and improved methods of fabricating low cost polyvinyl fluoride protected outdoor laminates without using an adhesive cement.

Briefly the foregoing objects are accomplished by assembling a core layer comprising a plurality of core sheets, a decorative print sheet layer on top of the core layer and a polyvinyl fluoride protective layer having at least one activated adherable surface. This surface is placed on top of the print sheet layer. This assembly is then consolidated into a bonded outdoor laminate by the use of heat and high pressure laminating techniques without the use of an adhesive layer of cement between the print sheet layer and the polyvinyl fluoride protective outer layer. The product has strong bond adhesion which resists weakening or delamination under testing and is useful as a superior outdoor laminate. The process is versatile and compatible with high pressure laminating techniques.

BRIEF DESCRIPTION OF THE DRAWING

For a better understanding of my invention, reference may be had to the accompanying drawings in which.

DESCRIPTION OF THE PREFERRED EMBODIMENTS

The protective outer layer used in this invention is based on unplasticized polyvinyl fluoride film. This film is commercially available in thicknesses from 0.5 to 5.0 mils from E. I. du Pont de Nemours and Co. Polyvinyl fluoride film is manufactured by a well known extrusion process described in U.S. Pat. No. 2,953,818, herein incorporated by reference. The polyvinyl fluoride films useful in this invention may be pigmented or transparent.

The properties of polyvinyl fluoride film include good abrasion resistance, a high level of inertness of solvents, chemicals and industrial stains and excellent weatherability. The film has outstanding resistance to sunlight due to its general chemical inertness and because it does not absorb the ultraviolet light of the solar spectrum.

Figure 1:
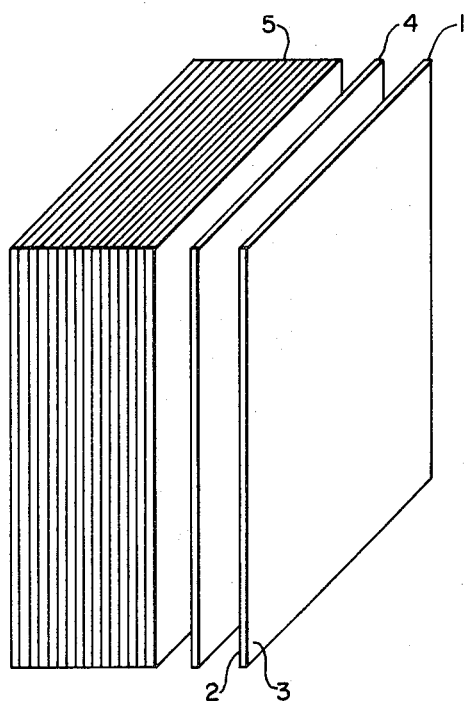
FIG. 1 shows an exploded three dimensional view of one embodiment of the laminate of this invention.
Figure 2:
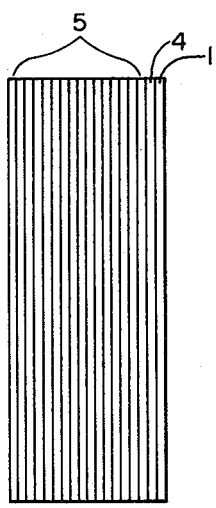
FIG. 2 shows a cross section of the laminate in consolidated form.

Referring to FIG. 1, the polyvinyl fluoride layer 1 used in this invention must have an activated adherable surface 2 on one side and preferably a non-activated, heat sealable surface 3 on the other side. The adherable surface treatment is well known in the art and described in U.S. Pats. 3,133,854, 3,274,088 and 3,284,331 herein incorporated by reference. In one such method of giving a polyvinyl fluoride layer an activated adherable side, the film is passed around an electrically grounded moving surface such as a rotating drum, while the outer face is electrically charged by passage close to a D.C. electrode. The charge must be sufficient to cause the film to adhere firmly to the moving surface and is about 0.23 microcoulomb per square inch. Then, the film is subjected to an electrical discharge at atmospheric pressure between spaced electrodes, one of which is the drum, by applying an A.C. current at a voltage in excess of 1,000 volts and at a frequency in excess of 350 cycles per second in a nitrogen or other atmosphere effective to create an electrical discharge between the electrodes. The film is then conducted away from the grounded drum. Such a method produces polyvinyl fluoride films advantageous to the laminating industry because while one surface is treated, the other retains its chemical inertness, soil and stain resistance, low surface adherability and good release properties. Another similar process involves exposing the film of polyvinyl fluoride to an electric discharge in an atmosphere of oxygen, nitrogen or air having a limited moisture content of about 1 to 3.5 grams per cubic meter, by passing the film around a grounded rotating drum serving as the negative electrode, with one or more positive electrodes affixed a certain distance from the drum and parallel to its axis of rotation. During the treatment the limited moisture atmosphere is constantly renewed through outlets near the electrodes.

Such processes modify the surface characteristics of one side of the film, by chemically activating it, making it highly receptive to inks and adhesives and more wettable by water. One method to determine if a surface of polyvinyl fluoride film is adherable is to allow a drop of a solution of 30% by weight n-propyl alcohol in water to spread on the film's surface. If the film is adherable, the drop will spread about twice as fast as would be the case of a film known not to have an activated adherable surface.

The print sheet layer shown as 4 in the drawings usually provides the decorative effect for the laminate. It is usually in the form of a decorative sheet, i.e. dyed, pigmented to impart a solid color, or printed with an ornamental design such as wood or marble grain. It usually comprises a single sheet of high grade absorbent alpha-cellulose or regenerated cellulose paper impregnated with a substantially completely cured amintriazine-aldehyde resin, usually a thermoset melamine-formaldehyde resin. Other useful print sheet materials are kraft paper synthetic fiber paper, cotton, linen and glass fiber fabrics and the like.

The rigidity-imparting core layer 5 usually comprises a plurality of sheets of kraft paper impregnated with phenolic resin.

Melamine is the preferred aminotriazine reactant for preparing the aminotriazine-aldehyde resin used to impregnate the print sheet. Melamine (1,3,5-triamino-2,4,6-triazine or cyanouramine) can be prepared by heating urea in the presence of ammonia at temperatures of 250 to 350° C. The overall reaction may be represented as:

$$6CO(NH_2)_2 \rightarrow C_3H_6N_6 + 3CO_2 + 6NH_3$$

Melamine can also be produced from dicyandiamide which is obtained by polymerization of cyanamide at elevated temperatures. The melamine is reacted with an aldehyde such as formaldehyde to yield a potentially thermoset resinous condensate capable of being converted under heat and pressure to a substantially insoluble and infusible form (see U.S. Pat. 2,197,357 and Brydson, Plastics Materials, D. Van Nostrand, 1966, "Melamine-Formaldehyde Resins," pp. 418–427.)

The mol ratio of aldehyde to aminotriazine in the resinous reaction product may be within the order of from about 1:1 to about 6:1 respectively. Conventional reaction conditions are observed in preparing the resin. Formaldehyde and water are charged and the pH adjusted to 7.5–9 with sodium hydroxide solution. The melamine is then added and the batch heated to reflux at about 210° F. and about 8–10 p.s.i. steam pressure. If desired, the thermosetting aminotriazine-aldehyde resin may be modified by the addition of plasticizers or curing catalysts. Other aminotriazines, e.g. mono-, di- and tri-methylmelamines, and the like; guanamines, such as formoguanamine, acetoguanamine, benzoguanamine, and the like, as well as mixtures of aminotriazines, may also be utilized as reactants. Similarly, formaldehyde, either as such or as an aqueous solution, is the preferred aldehyde reactant, but other aldehydes, e.g. acetaldehyde, propionaldehyde, butraldehyde, benzaldehyde, dialdehydes and the like, or compounds engendering aldehydes, e.g., paraformaldehyde, hexamethylene-tetramine, and the like, may also be employed. Such aminotriazine-aldehyde resins are well known in the art and reference may be made to U.S. Pat. 3,392,082 for exhaustive details on their production.

The thermosetting phenolic resins used to impregnate the plurality of core sheets are well known in the art (see U.S. Pats. 2,205,427; 2,315,087; 2,328,592 and 2,383,430 and Brydson, Plastics Materials, D. Van Nostrand, 1966, chapter 19). They are conventionally obtained by reacting a phenolic substance such as phenol itself, substituted phenols, e.g., alkyl phenols such as cresols, xylenols, tertiary alkyl phenols, and the like, or mixtures of such phenolic substances with an aldehyde such as formaldehyde, acetaldehyde, propionaldehyde, benzaldehyde, fufural, and the like, or with mixtures of such aldehydes, either alone or in the presence of other aldehyde-reactable substances such as urea, thiourea, substituted ureas and thioureas, aminotriazines, e.g., melamine, lignin derivatives, and the like.

The print sheet and core sheets are impregnated using standard techniques. The print sheet will be impregnated with a solution of aminotriazine-aldehyde resin to give a resin content between 30% and 75% by weight, based on the total dry weight of the impregnated sheet and then dried to a stage where the volatile content is between 2% and 10%. The core layer sheets are impregnated with a solution of phenolic resin to give a resin content between 25% and 40% by weight, based on the total dry weight of the impregnated sheet, and then dried to a stage at which the resin is only partly cured and has a volatile content between 4% and 15%.

High pressure laminating techniques are employed in preparing laminates from the above described core layer of core sheets, print sheet layer and top polyvinyl fluoride layer. The print sheet layer will generally be a decorative sheet and may carry a pattern. The polyvinyl fluoride layer may be transparent or pigmented.

The polyvinyl fluoride top layer, having an adherable activated side, is placed with its adherable surface against the print sheet layer. No adhesive cement layer is used to bond the two together. Then the top layer and print sheet layer are assembled with the rigidity-imparting core sheets, and inserted in a laminating press between press plates which are generally stainless steel and may have finishes ranging from a mirror polish to a matte surface. The assembly is then consolidated by means of heat and pressure into a unitary decorative structure.

Temperatures ranging from about 250° F. to about 320° F. and pressures ranging from about 1000 p.s.i. to 1500 p.s.i. are employed. The time required to effect a cure of the resinous components of the assembly will usually be from about 5 minutes to about 45 minutes. The resulting laminate is generally allowed to cool to about 100° F. before being removed from the press. In certain cases it may be desirable to use a thin release sheet, such as for example a sheet of metal foil or paper coated with a release agent such as calcium stearate, or other means such as a coating of calcium stearate between the polyvinyl fluoride layer and the press plate of the laminating mold. Such release means can be used when it is desirable to use a polyvinyl fluoride layer having an adherable activated surface on both sides of the sheet.

The invention is illustrated by the following example.

EXAMPLE

A roll of 105 lb. kraft paper was treated with a solution of phenol-formaldehyde resin to give a resin content between 31% and 35% and then dried to a stage at which the resin was only partly cured and had a volatile content between 6% and 9%. Equal size impregnated core sheets, 12" x 18", were cut from the roll and assembled in a stack of 12 sheets to form a core layer. A layer comprising a 12" x 18" sheet of alpha-cellulose paper having a marble print pattern was impregnated with melamine-formaldehyde resin and superimposed on the stack followed by a 12" x 18" clear polyvinyl fluoride film sheet 1.0 mil thick (sold by E. I. du Pont de Nemours and Co. under the trade name Tedlar). The melamine-formaldehyde resin content of the print sheet prior to drying was between 41% and 43% and after curing it had a volatile content between 3.5% and 5.0%. The polyvinyl fluoride film had an adherable activated surface, which was placed directly in contact with the print sheet, and a non-activated heat sealable surface which became the outside surface. No adhesive cement layer was used between this polyvinyl fluoride protective film and the print sheet surface. The assembly was placed in a press and molded against a chrome polished steel pressing plate at 1200 p.s.i. with a platen temperature of 315° F. The controlled internal temperature was 17 minutes above 269° F. with a maximum temperature of 296° F. The assembly was heated in the press for a total of about 35 minutes. About 20 minutes was required for warm-up after placing the laminate in the press.

The laminate was allowed to cool for about 5 minutes and then the durability of the polyvinyl fluoride bond to the laminate substrate was tested by the National Electrical Manufacturers Association (NEMA), Test for Immersion in Boiling Water. After two hours boiling by this test the specimen was examined for evidence of delamination. The boiled specimen showed no sign of a weakened bond, either in the wet condition or after drying out.

The laminate was also tested in an Atlas Weather-O-Meter according to ASTM standards E42–65 and D1499–64. This device rotates the sample so that it is successively exposed to ultraviolet light from a carbon arc and to a spray of distilled water. The carbons are changed after 19–20 hours so that the sample is normally aged about 100 hours per week. R. J. Martinovich and G. R. Hill in a paper presented at the Symposium on the Weatherability of Plastic Materials, Feb. 8 and 9, 1967 at the National Bureau of Standards, Gaithersburg, Md., stated that "Weather-O-Meter results indicated that 1000–2000 hours exposure is approximately equivalent to 12–24 months in Arizona at 45° South." They also stated that one year's exposure in Arizona is roughly equivalent to 2 years in Oklahoma and 3 years in Ohio. Our tests show there has been little change in the polyvinyl fluoride surfaced laminate after 1000 hours' exposure in the Weather-O-Meter.

The melamine formaldehyde and phenol formaldehyde impregnating resins were prepared as follows.

To 1620 lbs. (20 moles) of 37% formaldehyde, with a pH adjusted to about 7.5 with sodium hydroxide, was added 1260 lbs. (10 moles) of recrystallized melamine. The slurry pH was adjusted to about 8.2 with 10% sodium hydroxide as needed. The mixture was heated to reflux (98–99° C.) and held at that temperature until a drop or two of the batch when dropped into water at 25° C. formed a cloudy tail as the droplet dispersed throughout the water. At this point the reaction temperature was reduced to about 80° C. and then cooled to 60–65° C. and the following materials added in order, 200 lbs. of ethyl alcohol, o-, p-toluene sulfonamide and 186 lbs. of methyl glucoside. Mixing was continued to complete solution. Finally 734 lbs. of water were added and the pH adjusted to about 9.1 to produce a composition suitable for saturating the print paper.

To 940 lbs. (10 moles) of molten phenol were added 1012 lbs. (12.5 moles) of 37% formaldehyde solution. To this was added a sodium hydroxide solution containing 15 lbs. (0.375 mole) of sodium hydroxide flakes dissolved in 30 lbs. of water. The mixture was reacted at 98° C. reflux and then diluted with methyl alcohol to a solids content of about 41% determined by a standard procedure of heating the specimen of resin for two hours at 170° C. This varnish was used to saturate kraft paper for the core stack of the laminate.

I claim:
1. A unitary, heat and pressure consolidated weather resistant decorative laminated article comprising:
   (a) a rigidity-imparting core layer comprising a plurality of sheets impregnated with a phenolic resin,
   (b) a print sheet layer impregnated with aminotriazine-aldehyde resin,
   (c) a polyvinyl fluoride layer having at least one adherable activated side, said activated side being directly bonded to said print sheet layer without the use of an adhesive layer.
2. The article of claim 1 wherein the aminotriazine-aldehyde resin is a melamine-formaldehyde resin.
3. The article of claim 2 wherein the phenolic resin is a phenol-formaldehyde resin.
4. The article of claim 3 wherein a side of the polyvinyl fluoride layer is activated by an electrical discharge produced by alternating current at a voltage greater than 1000 volts and at a frequency greater than 350 cycles per second in an atmosphere effective to create an electrical discharge.
5. The article of claim 4 wherein the polyvinyl fluoride layer is pigmented.
6. The article of claim 4 wherein the polyvinyl fluoride layer is transparent and the print sheet layer is in the form of a decorative sheet.

References Cited

UNITED STATES PATENTS

| 3,133,854 | 5/1964 | Simms | 161—189 |
| 3,153,683 | 10/1964 | Bryan et al. | 264—80 |
| 3,153,684 | 10/1964 | Bryan et al. | 264—80 |
| 3,403,071 | 9/1968 | Perry et al. | 161—189 |
| 3,421,971 | 1/1969 | Kamal | 161—189 X |

HAROLD ANSHER, Primary Examiner

U.S. Cl. X.R.

161—248, 258; 204—165